United States Patent
Rhodes (10) Patent No.: US 12,243,003 B2
(45) Date of Patent: Mar. 4, 2025

(54) AUTOMATIC PARCEL DELIVERY VIA MACHINE-READABLE CODE

(71) Applicant: Quadient Technologies France, Bagneux (FR)

(72) Inventor: Vaughn Rhodes, Pleasant Grove, UT (US)

(73) Assignee: Quadient Technologies France, Bagneux (FR)

( * ) Notice: Subject to any disclaimer, the term of this patent is extended or adjusted under 35 U.S.C. 154(b) by 33 days.

(21) Appl. No.: 17/994,808

(22) Filed: Nov. 28, 2022

(65) Prior Publication Data

US 2024/0177105 A1    May 30, 2024

(51) Int. Cl.
| | | |
|---|---|---|
| G06Q 10/0836 | (2023.01) | |
| G06Q 10/083 | (2024.01) | |
| G06K 7/14 | (2006.01) | |
| G06K 19/06 | (2006.01) | |

(52) U.S. Cl.
CPC ..... G06Q 10/0836 (2013.01); G06Q 10/0838 (2013.01); *G06K 7/1417* (2013.01); *G06K 19/06037* (2013.01)

(58) Field of Classification Search
CPC .................................................. G06Q 10/0836
See application file for complete search history.

(56) References Cited

U.S. PATENT DOCUMENTS

| | | | |
|---|---|---|---|
| 6,862,576 B1 | 3/2005 | Turner | |
| 7,653,457 B2 | 1/2010 | Bloom | |
| 8,370,307 B2 | 2/2013 | Wolfe | |
| 9,811,784 B2 | 11/2017 | Wan | |
| 11,468,393 B1 | 10/2022 | Kalathil | |
| 2002/0035515 A1 | 3/2002 | Moreno | |
| 2003/0025590 A1 | 2/2003 | Gokcebay | |
| 2004/0015393 A1 | 1/2004 | Fong | |
| 2005/0068178 A1 | 3/2005 | Lee | |
| 2009/0326808 A1* | 12/2009 | Blanton | G06Q 30/04 |
| | | | 701/408 |

(Continued)

FOREIGN PATENT DOCUMENTS

| | | | | |
|---|---|---|---|---|
| CN | 202501903 U | 10/2012 | | |
| DE | 10246650 A1 * | 4/2004 | ............... | E05G 1/08 |

(Continued)

OTHER PUBLICATIONS

Extended European Search Report issued in App. No. EP23305493, dated Jul. 21, 2023, 9 pages.

(Continued)

*Primary Examiner* — George Chen
(74) *Attorney, Agent, or Firm* — Butzel Long (57) ABSTRACT

An automated computerized parcel locker system is provided, which includes multiple lockers in a common housing, each having one or more sensors that indicate whether an item is present in the locker, the status of the locker door, and the like. Systems and processes for efficient delivery of multiple parcels in a single package manifest are provided, which allow the system to instruct a courier to deliver each parcel to a specific locker in the system. The package manifest may allow for the set of parcels to be treated as a single delivery, while still using individual package recipient information to properly route parcels to intended recipients.

16 Claims, 2 Drawing Sheets

(56) References Cited

U.S. PATENT DOCUMENTS

| | | |
|---|---|---|
| 2010/0004960 A1 | 1/2010 | Frankenberg |
| 2011/0025181 A1 | 2/2011 | Mnke |
| 2012/0326840 A1 | 12/2012 | Frankenberg |
| 2013/0144428 A1* | 6/2013 | Irwin .................. G07F 17/10 700/218 |
| 2013/0261792 A1 | 10/2013 | Gupta |
| 2014/0034727 A1 | 2/2014 | Hancock |
| 2014/0258168 A1 | 9/2014 | Crawford |
| 2014/0279658 A1 | 9/2014 | Lievens |
| 2015/0106296 A1* | 4/2015 | Robinson ........... G06Q 10/0838 705/339 |
| 2015/0149772 A1 | 5/2015 | Leavy |
| 2015/0158679 A1 | 6/2015 | Remi |
| 2015/0186840 A1 | 7/2015 | Torres |
| 2015/0371187 A1 | 12/2015 | Irwin |
| 2016/0025549 A1 | 1/2016 | Motoyama |
| 2016/0066733 A1 | 3/2016 | Gozar |
| 2016/0335595 A1* | 11/2016 | Levy .................. G06Q 10/087 |
| 2018/0365641 A1* | 12/2018 | Zhu .................... G06K 7/1417 |
| 2019/0102962 A1 | 4/2019 | Miller |
| 2019/0114859 A1 | 4/2019 | Fee |
| 2019/0130349 A1 | 5/2019 | Ferguson |
| 2019/0197809 A1 | 6/2019 | Razzoli |
| 2020/0219051 A1 | 7/2020 | Karpenko |
| 2021/0183198 A1 | 6/2021 | Estill |
| 2021/0201258 A1 | 7/2021 | Perez |
| 2022/0196412 A1* | 6/2022 | Lee ................... G01C 21/3626 |

FOREIGN PATENT DOCUMENTS

| | | |
|---|---|---|
| EP | 3723014 A1 | 10/2020 |
| GB | 2352073 | 1/2001 |

OTHER PUBLICATIONS

Extended European Search Report for App. No. EP23307072, dated Mar. 25, 2024, 13 pages.
Hyperconnected City Logistics: Smart Lockers Terminals & Last Mile Delivery Networks, Louis Faugere and Benoit Montreuil, 3rd International Physical Internet Conference, Atlanta, GA (Jun. 29-Jul. 1, 2016). (Year: 2016).

* cited by examiner

AUTOMATIC PARCEL DELIVERY VIA MACHINE-READABLE CODE

BACKGROUND

A parcel locker device typically includes multiple lockers configured to receive one or more parcels for delivery to recipients. When a courier delivers a parcel to the locker device, the locker will indicate a specific recipient and a specific locker in which the parcel should be placed based on a running list of available or occupied lockers. Parcel locker systems are seeing increased use, especially in multi-recipient locations such as apartment complexes, business offices and business parks, gated communities, retirement communities and the like. In a conventional parcel locker system, parcels are delivered to a common locker device, which automatically identifies an available locker in which a courier is instructed to place a parcel for retrieval by the individual recipient.

SUMMARY

Embodiments disclosed herein provide automated parcel locker systems including a plurality of lockers, each having an associated door and an associated sensor, and method of operating the same, which include scanning a first machine-readable code provided by a parcel courier; obtaining a package manifest linked to the first machine-readable code, the package manifest including delivery information for a plurality of parcels to be delivered to the parcel locker system; for each parcel in a set of parcels listed in the package manifest: obtaining recipient information for the parcel from the package manifest; determining whether the recipient information for the parcel matches a recipient served by the parcel locker system; and if the recipient information matches a recipient served by the parcel locker system, assigning a locker of the plurality of lockers to the each parcel or, if the recipient information does not match any recipient served by the parcel locker system marking the parcel as undeliverable to the parcel locker system. The system and method may further, for each parcel assigned to a locker of the plurality of lockers: scan a machine-readable code assigned to the parcel assigned to a locker; open a door of the locker to which the each parcel was assigned; receive a signal from a door of the locker to which the each parcel was assigned indicating that the door was closed; and subsequent to receiving the signal from the door, notify the courier, a recipient of the each parcel assigned to the locker, or both, that the parcel was delivered to the parcel locker system.

The first machine-readable code may be a QR code, a barcode, or the like, and it may encode the entirety of the package manifest. Obtaining the package manifest linked to the first machine-readable code may include receiving the package manifest from a remote parcel locker management system. Determine whether the recipient information for each parcel matches a recipient served by the parcel locker system may include applying one or more text matching algorithms to find a match, such as phonetic similarity; a presence or absence of spaces and/or hyphens; missing recipient name components; split and/or mismatched recipient database fields; recipient name spelling differences; differences in recipient titles; order variations; language differences; nicknames and/or shortened names; recipient truncations; initials used in place of full names; and variant names. For a parcel listed in the package manifest and not included in the set of parcels, the system may determine that recipient information for the parcel not included in the set of parcels matches a recipient served by the parcel locker system; determine that no available locker in the parcel locker system is capable of receiving the parcel not included in the set of parcels; and responsive to determining that no available locker in the parcel locker system is capable of receiving the parcel not included in the set of parcels, provide fallback delivery instructions to the courier.

DETAILED DESCRIPTION

Conventional parcel locker systems often use an online interface to exchange information with courier systems and/or locker management systems. When a courier delivers multiple packages to a single locker system, with each intended to be placed in a separate locker for delivery to separate recipients, the courier typically enters information in an interface of the locker system for each parcel, or scans a one-dimensional bar code attached to and associated with each parcel to provide delivery information to the parcel locker system. The parcel locker system and/or a delivery device of the courier, such as a hand-held scanner, may then provide information about each parcel delivery to the courier's system via a remote application programming interface (API) or similar. However, such a system may be inefficient when multiple parcels are delivered to a single parcel locker system, and/or where a network connection is not readily available or not reliable. Conventional parcel lockers also typically require each courier delivering parcels to the locker system to manually enter each recipient's delivery information such as name, unit/building/apartment number, and the like, into the system individually. This may be done by scanning a machine-readable code such as a barcode affixed to each parcel to reduce direct data entry by the courier(s), but such codes still require each parcel to be processed and delivered to the parcel locker system individually.

Instead of using an online API to exchange parcel information with the locker system as in conventional systems, embodiments disclosed herein allow a courier to use a scannable optical code such as a QR code or other machine-readable code or equivalent to exchange data bi-directionally directly between the courier and the parcel locker system. The courier QR code may contain, for example, courier locker access credentials as well as a manifest with all the information about a set of packages being delivered, including resident name, door size needed for each parcel, and the like, thereby allowing for delivery of multiple packages in a more efficient manner than what is possible using conventional parcel locker and delivery systems. More generally, the QR or other machine-readable code may be linked to the package manifest, either by encoding the manifest directly and entirely within the machine-readable code, or by providing an active link that parcel locker system or a courier device may access to obtain the package manifest. Embodiments disclosed herein thus avoid the need for each courier to process each parcel in a group of parcels individually. Embodiments disclosed herein also may respond to non-standard situations more intelligently than is possible in conventional parcel locker systems, such as the case where a desired door/locker size is unavailable; what action(s) to take if a parcel won't fit into an assigned locker; a courier stopping the delivery process partway through delivering multiple parcels; allowing for correction of delivery errors by the courier; how to respond if an intended recipient is not found in the parcel locker database or is not a resident at the location(s) served by the parcel locker system; or the like.

In some embodiments, multiple machine-readable codes may be used by an automated parcel locker system as disclosed herein. For example, a barcode scanner, such as an infrared, laser, or visual sensor and/or camera, may be used to scan a delivery QR code, which may include both a courier locker access code and a full package manifest list. After scanning the delivery QR code, the courier may scan a one-dimensional (1D) package barcode or QR code for each individual parcel and deliver each to the parcel locker system. The parcel locker system may automatically assign lockers in the system to individual parcels, notify recipients, and handle other aspects of individual parcel delivery. When the entire delivery is complete, the automated parcel locker system may display a new QR code with all the information about the packages in the manifest, indicating which were delivered or attempted to be delivered to the locker system. The courier may scan this QR code to receive the delivery information for all the parcels delivered with the original delivery QR code, i.e., all parcels in the batch that were delivered at the same time.

Figure 1:
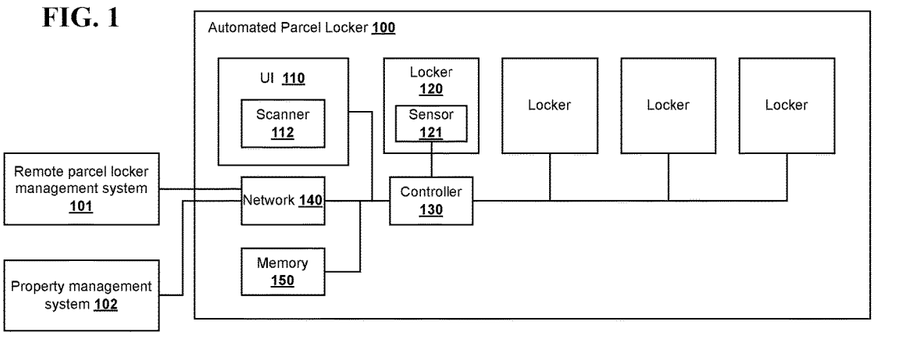
FIG. 1 shows a schematic illustration of an example automated parcel locker system as disclosed herein.

FIG. 1 shows a schematic illustration of an automated parcel locker system as disclosed herein. The parcel locker system 100 may include any number of individual lockers 120, each of which may be associated with one or more sensors 121. The sensors may include, for example, a pressure, weight, optical, or similar sensor to detect whether an item is present in the locker, a door open/close sensor to indicate the status of a door as open or closed, and/or an open/close sensor that indicates when a door changes state, e.g. from open to closed or vice-versa, or any combination thereof. For example, one or more sensors may be used to determine whether an item is present in the locker, which information may be provided via an electronic signal to the controller 130 and used in the processes disclosed herein wherever a parcel is delivered to the locker 100. Similarly, any suitable type of door sensor may be used to determine the status or activity of the locker door, which information may be provided via electronic signal to the controller 130 and used in the processes disclosed herein.

A user interface 110 may include a display screen and one or more interface components such as a keyboard, touch screen, visual indicators, or the like. A controller 130 may include one or more processors and software to allow for control and management of the lockers 120, sensors 121, and user interface 110. A local memory 150 also may be used to store information such as package manifests, user interface data, and the like, as disclosed herein. Any such data may be obtained from a remote management system 101 connected to the automated parcel locker system 100 via the network interface 140. The components may be communicatively coupled such as via a communications bus, local wireless or wired network, or the like.

During operation of the processes disclosed herein, generally the controller 130 may direct operation of the lockers 120 and their associated doors, sensors 121, and the like. The controller 130 also may generate and provide user interface prompts and other components to the interface 110, receive input from the users via the same, and operate the parcel locker system 100 according to the same. The parcel locker 100 also may be in communication with other components, such as a property management system 102 that otherwise manages residences or businesses served by the parcel locker system 100, such as via wired or wireless network connections 140.

The user interface 110 also may include a scanner 112 capable of sensing and reading a machine-readable code such as a QR code, a bar code, or the like, as disclosed in further detail herein. The scanner 112 may be communicatively coupled to other components of the system 100, including the user interface 110, for example, to allow the system to confirm data encoded in the machine-readable code to a courier, provide prompts generate by the controller 130 based on such information, request correction or confirmation of such information from the courier, or the like.

Figures 2A, 2B:
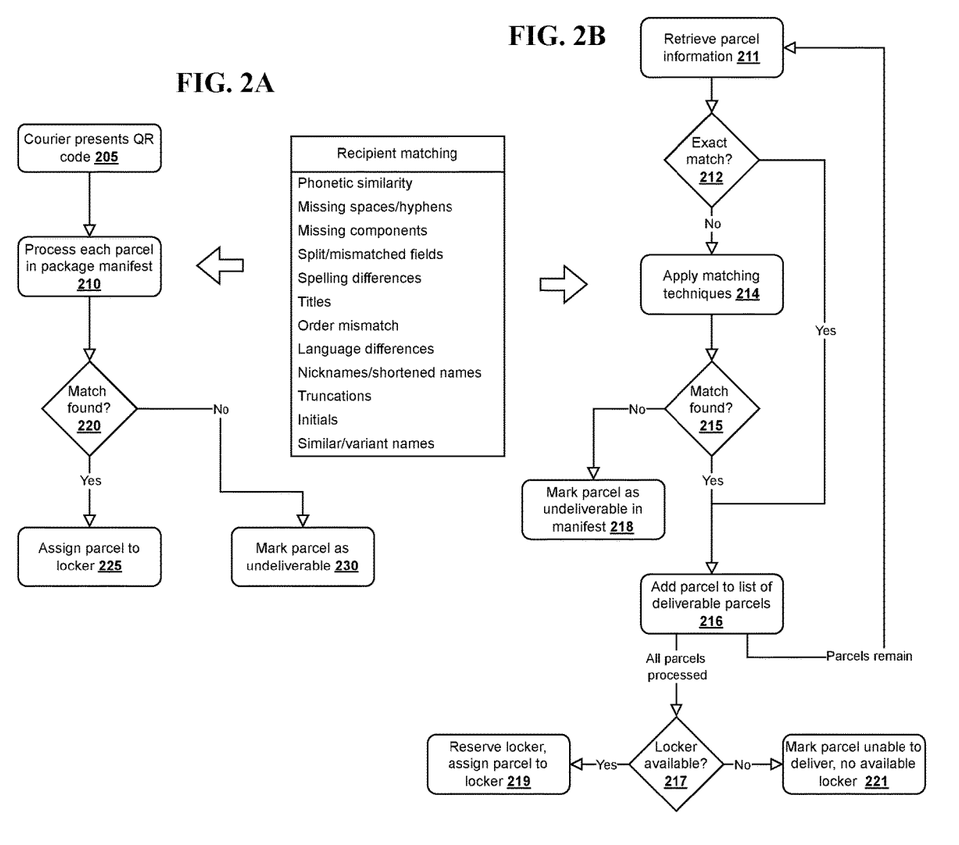
FIG. 2A shows an example process for delivering multiple parcels by a courier to an automated parcel locker system as disclosed herein.
FIG. 2B shows a bulk delivery process for multiple parcels delivered to an automated parcel locker system as disclosed herein.

FIG. 2A shows an example process for delivering multiple parcels by a courier to an automated parcel locker system as disclosed herein. The process begins at 205, when a courier presents a QR code to the locker, for example via a scanner 112 as previously disclosed. The QR code may be presented via a mobile phone, a dedicated handheld device such as are used by couriers in the industry, or any other suitable device. The QR code may be scanned by the parcel locker system without requiring initial interaction by the courier. For example, the parcel locker system may generally return to a state in which a scanner 112 may be in a low-power "sleep" mode, with a passive secondary scanner used to bring the scanner and UI 110 out of the sleep mode when a QR code is presented. The user interface also may display initial instructions, either while awaiting an interaction from a user or once awoken from the low-power mode.

Figure 3A:
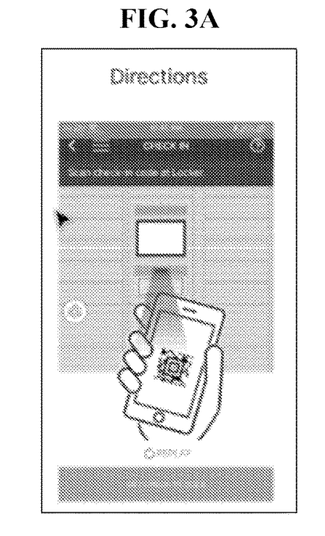
FIG. 3A shows an example interface that may be displayed by the automated parcel locker system as disclosed herein.
Figure 3B:
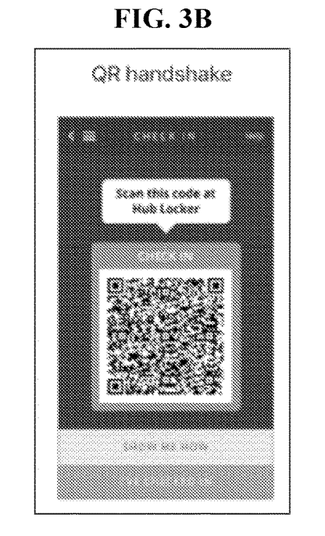
FIG. 3B shows an example interface that may be displayed on the courier's phone, dedicated handset, or similar device, as disclosed herein.

FIG. 3A shows an example interface that may be displayed by the automated parcel locker system to prompt a courier to present a QR code for parcel delivery. Other interface screens may be available and/or displayed when the parcel locker system is in use, such as a screen providing instruction for recipients looking to retrieve a parcel, a screensaver, or the like, or the screen may be "blanked" in a low-power mode. FIG. 3B shows an example interface that may be displayed on the courier's phone or dedicated handset, providing the QR code for the delivery. The QR code may have been selected from a set of available codes, such as where the system provides a separate QR code for each delivery address, or it may be a set code that is assigned to the particular courier and linked to multiple delivery locations, parcels, and the like in the courier's parcel tracking system.

In an embodiment, the QR code may encode directly or be linked to a variety of data, including an access code assigned to the courier or the courier company (e.g. FedEx, UPS, the USPS) and a package manifest including data for all parcels to be delivered to a particular parcel locker, all parcels to be delivered for the day or a particular route, or the like. More generally, the package manifest may include all information about each parcel needed by the courier, such as whether a signature is required. In some cases, parcel data may include an identifier for the specific address or location of the parcel locker system. For example, the package manifest may include any or all of the following information for each parcel to be delivered: Courier tracking number, Recipient first/last/full name, Recipient address and/or unit number, locker size needed (e.g., small, medium, large, extra large, over-sized S/M/L, and the like), whether a signature is required for delivery/receipt, and the like. The QR code or other machine-readable code also may include access credentials that identify the courier and/or the courier company. Such an arrangement may be desirable to further reduce the complexity of the multi-parcel delivery, by omitting any need for the courier to separately "log in" to the parcel locker system or otherwise provide credentials showing that the courier is authorized to access the locker system.

Referring again to FIG. 2A, at 210 the parcel locker system may process the QR code to load package manifest information. The package manifest information may be obtained from a memory of the parcel locker system, via communication with a backend management system for the parcel locker system, or a combination thereof. For example, the QR code scanned at 205 may include a unique identifier that is linked to an electronically-stored copy of the package manifest in a database of a management system of a parcel locker system as disclosed herein.

A parcel locker system 100 as described with respect to FIG. 1 also may store a list of residents, business, or other recipients served by the parcel locker system 100, which may have been provided by a property management system 102 or other local system that maintains a list of current recipients served by the system 100. At 210, the parcel locker system 100 obtains the package manifest information associated with the QR code, for example from a remote management system 101 or local storage 150. Alternatively, the QR code may encode the package manifest directly. QR codes as used herein may encode a sufficient amount of data that a single QR code can include tracking number, recipient name and address, package size, delivery requirements (delivery time, signature requirements, etc.) for each package in the shipment. In such an embodiment, there is no need for the parcel locker system to reference a manifest at a remote management system. Once the package manifest is obtained, the parcel locker system compares each entry in the manifest against the recipient database obtained from the property management system 102 or local storage 150. This comparison is performed because, although the package manifest includes all information about all parcels to be delivered, it cannot directly include current residence information for the location(s) served by the parcel locker system, since resident information always may have changed from the time the parcel(s) were sent and/or the package manifest was generated and the time the courier arrives at the parcel locker system to deliver the parcels. Accordingly, the local recipient database must be used to verify current recipient information.

Each parcel listed in the package manifest is processed to assign the parcel to a recipient linked to the parcel locker system. If an exact match is found between a recipient in the manifest and a recipient served by the parcel locker system, the parcel is assigned to that recipient and assigned to a locker and the courier is instructed to place the parcel into a designated locker. When a parcel is assigned to a locker, the parcel locker system may identify a suitably-sized locker (based on parcel dimensions available from the package manifest) that is unoccupied and/or available, assign the parcel to that locker, instruct the courier to place the parcel in the locker, and notify the recipient using a standard delivery notification process used by the parcel locker system. For example, the recipient may be sent an email, text message, or other notification that a parcel has been delivered. The recipient may then access the locker via an access code assigned to the particular parcel delivery, and/or a barcode, QR code, or other similar machine-readable code assigned to the recipient which is then linked to the assigned locker for purposes of the individual delivery, or the like.

Returning again to 210, if an exact match is not found between a recipient on the package manifest and the list of recipients served by the parcel locker system, the system may use a variety of text processing techniques to identify a correct recipient based on the recipient listed in the manifest. Such techniques may use industry-standard fuzzy matching algorithms as are known in the art, in any suitable order, and various techniques may be performed concurrently and/or consecutively, for example based upon the computing resources available from the controller 130, bandwidth limitations, and the like. Examples of text processing techniques that may be used by the system include, without limitation, some, any, or all of the techniques listed in Table 1. It may be desirable for this process to be as robust and include as many matching techniques as possible to address, for example, courier databases that are out of date, recipient names that were erroneously entered by the sender or the courier, errors in entry by the sender that were accepted by the courier, a lack of synchronization between a courier recipient database and known or standardized recipient names, or the like.

TABLE 1

| Processing Technique | Example Matches |
| --- | --- |
| Phonetic similarity | Aaron/Erin/Eran |
|  | Jesus/Heyzeus/Haezoos |
| Missing spaces/hyphens | MaryEllen/Mary Ellen/Mary-Ellen |
|  | William Sonoma/Williams-Sonoma/Williams-Onoma |
| Missing components | Phillip Charles Carr/Phillip Carr |
| Split/mismatched database fields | Dick, Van Dyke/Dick Van, Dyke |
| Spelling differences | Abdul Rasheed/Abd al-Rashid |
|  | Mary/Marie/Merry |
| Titles | Dr/Mr/PhD/Doctor/Drs |
| Component order mismatch | Diaz, Carlos Alfonzo/Carlos Alfonzo Diaz |
| Language differences | Mao Zedong/Mao 澤東/Mao泽东/毛泽东 |
| Nicknames or shortened names | William/Will/Bill/Billy |
| Truncations | McDonalds/McDonald/McDnds/McD |
| Initials used in place of full names | James Earl Smith/J. E. Smith |
| Similar/variant names | Eagle Pharmaceuticals/Eagle Pharma/Eagle Drugs Co. |

If a match is found that is determined to be the correct recipient at 220, for example if a match has a similarity score or equivalent measure that is above a threshold of acceptability, at 225 the associated parcel is assigned to a locker as previously disclosed at 210.

If no match (or no acceptably-similar match) is found at 220, the delivery may be marked on the package manifest as undeliverable, or it may be flagged for review by the courier, a property manager, or the like at 230. In the event that the determined confidence level in the match is found to be below a threshold indicating that the match is unreliable and thus not sufficiently accurate to proceed with full automatic-match, the parcel locker system may display one or more best-guess potential matches from which the courier may select to confirm delivery. It will also offer a manual match fallback option as disclosed in further detail below, in which the courier can type and search for the resident by unit, name, and so on. If ultimately no match can be found, then the courier may be presented with the property's preference for what to do with undeliverable packages, as described in further detail below.

In some embodiments, it may be desirable to pre-process the parcels in the package manifest without delivering parcels to lockers one at a time, for example to allow for all parcels to be delivered to appropriately-sized lockers. Using the basic process shown in FIG. 2A, for example, may result in a parcel being assigned to a locker that would be better suited for a different parcel listed later in the manifest. In this situation, the courier may have to retrieve and re-deliver a parcel to a different locker, or the later parcel may erroneously be marked as "undeliverable" due to no suitable locker being available. To address these and other issues, a bulk delivery process as shown in FIG. 2B may be used instead of the basic locker assignment shown at 210-230 in FIG. 2A.

The bulk delivery process begins at 211, when information for a first parcel is obtained from the package manifest as previously disclosed. At 212 the recipient listed in the package manifest for the selected parcel is compared to the recipient list for the parcel locker system as previously disclosed at 210, i.e., first to determine if an exact match exists. If an exact match is found at 212, the process continues to 213 for the selected parcel. If no exact match is found at 212, the recipient matching techniques are applied at 214 as previously disclosed to find a closest match. If no acceptably-close match is found at 215, such as where no matching technique results in a similarity score that exceeds a threshold, the parcel may be marked in the manifest as undeliverable at 218 for further manager review as previously disclosed at 230.

If a match is found, the parcel is added to a list of deliverable parcels. The process repeats from 211 for each parcel in the manifest. Once all the parcels have been processed, at 217 the list of deliverable parcels is processed one at a time to identify a suitable locker for the parcel. If a locker is available, the locker is reserved for the parcel and the parcel is marked as "OK to deliver", "deliverable", or similar in the package manifest at 219. If no locker is available, at 221 the parcel is marked as "cannot deliver due to no locker available" or similar. The process of FIG. 2B may be performed relatively quickly for any typical number of parcels being delivered to a parcel locker system. For example, it may be performed in 2 seconds, 1 second, or less for 10, 20, 30, 40, 50, or more parcels being delivered to the parcel locker system.

Once the package manifest has been processed to mark each parcel as deliverable or not through the process in FIG. 2B, the automated parcel locker system instructs the courier to scan the barcode or other identifier on each individual parcel. Such scanning was not previously necessary in the delivery process as the parcel information including recipient, parcel dimensions, and the like, is included on the package manifest linked to the first QR code as previously disclosed.

Figure 4:
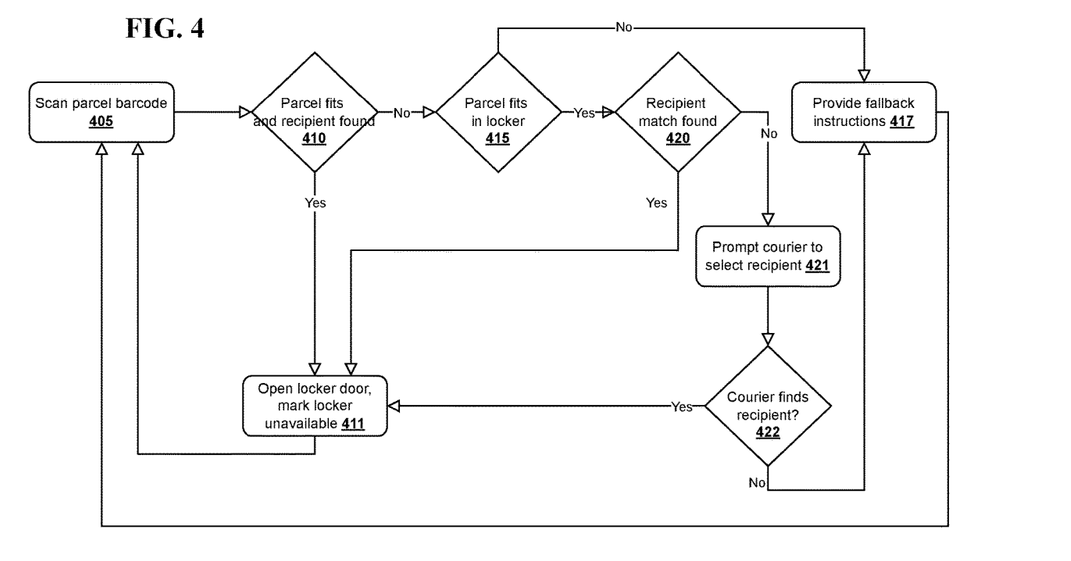
FIG. 4 shows a process for delivering parcels to individual lockers as disclosed herein.

FIG. 4 shows a process for delivering parcels to individual lockers. At 405, the courier scans a barcode, QR code, or other individual machine-readable code assigned to and, in most cases, affixed to an individual parcel.

At 410, if (1) the parcel will fit in the locker to which it was temporarily assigned in the process of FIG. 2B, given the other temporarily reserved lockers and any additional deliveries that were made from the manifest prior to the current parcel; and (2) a matching recipient was found, the parcel locker system opens the door of the assigned locker and instructs the courier to place the parcel in the locker at 411. The locker is marked as occupied and, in some cases, unavailable, and the process returns to 405 to process the next parcel in the package manifest. Embodiments disclosed herein may distinguish between a locker that is occupied but still available to receive another parcel delivery, and a locker that is unavailable to receive a further parcel delivery. For example, it may not always be the case that a locker that will be used to deliver a package is unoccupied—if a second parcel is to be delivered to the same recipient as an earlier parcel, and if the parcel locker system (via a controller as disclosed herein) determines that the new parcel will fit into a locker that already has a parcel for the same recipient (based on known package dimensions and known locker dimensions), then the system may allow second and further parcels to be delivered to the same locker. Accordingly, in some cases a locker may be "occupied" as disclosed herein, while still being considered "available" for delivery of a parcel to a common recipient. As used herein, when a locker is described as being marked as "occupied" or "unavailable," if allowed by other circumstances and statuses assigned to that locker, it may still be considered as "available" for a further delivery to a common recipient.

If the parcel does not fit in the locker at 415 per the processing of the manifest at FIG. 2B and at 410, regardless of whether a recipient was found, the parcel locker system goes to 417 and provides fallback instructions to the courier. Examples of fallback instructions and processes are described in further detail below. In some embodiments the determination of parcel size at 415 may be performed before the determination at 410.

At 420, if no match to an existing resident is found in the parcel locker system's recipient database, the courier is prompted to identify the recipient from the available recipients at 421. For example, the system may present an interface that allows the courier to search or scroll through the available recipients and select the correct recipient. Recipients may be presented by name or partial name, building, apartment, or business number, or any other convenient interface. If the courier finds the correct recipient at 422, the locker door is opened and the locker is marked as unavailable at 411 as previously disclosed. Otherwise, the courier may indicate that no matching resident could be found. The system may proceed to display the fallback instructions 417 as previously disclosed, or the courier may be responsible for determining what action to take with the parcel, such as returning it to the sender or delivering to a central location such as a front desk, loading dock, or the like. The package manifest also may be updated to show that a recipient for that parcel could not be found.

After a parcel has been processed and the courier has delivered the parcel to an assigned locker, the courier may need to close the assigned locker door to continue scanning the next parcel. That is, the locker door being closed may signal to the parcel locker system that the delivery of that parcel is complete and the package manifest can be updated, after which the parcel locker system will continue the process to allow for scanning and delivery of the next parcel. If the door of the assigned locker does not detect that the door has been closed, or if the sensor of the assigned locker does not detect a parcel within the locker, a conventional sensor-check process may be performed. For example, the parcel locker system may prompt the courier to confirm that a parcel was placed in the locker and may poll the locker's sensor again to determine if a parcel is detected. When appropriate, a locker may be added to a list for review by a technician, property manager, or the like, for example to determine if a sensor is malfunctioning, if there is another object interfering with the sensor, or the like. Other examples of processes used to manage operation of lockers and sensors and to manage delivery and reception by residents, property managers, and the like, are disclosed in U.S. patent application Ser. No. 17/994,757, filed Nov. 28, 2022 and published as U.S. Patent Pub. No. 2023/0316836, entitled "Automatic Handling of Mis-Delivered Items in Computerized Parcel Locker Systems," the disclosure of which is incorporated by reference in its entirety.

Once the locker door is closed and the process continues to 405 for the next parcel, the package manifest may be updated to reflect the current disposition of the parcel, i.e., delivered, not delivered, undeliverable, no recipient found, and the like as previously disclosed.

Other scenarios may be encountered and addressed by an automated postal locker system as disclosed herein. For example, at 405 in FIG. 4, the system may determine that the barcode scanned by the courier has already been scanned and successfully delivered to a locker. In that case the system may display a prompt indicating that the parcel apparently was delivered. An option to "re-deliver" the parcel may be presented, i.e., the courier may be provided an option to perform the delivery process of FIGS. 2B and 4 again. If the courier decides to re-start the delivery process, the locker assigned to that parcel tracking number is opened and the parcel is un-marked as being successfully delivered. The courier can then retrieve whatever parcel is in the locker and re-deliver it through the processes previously disclosed herein. This "re-delivery" process may allow for correction of a situation where, for example, a courier accidentally places an incorrect parcel into an opened locker.

Another situation the locker system may need to address is when a barcode fails to scan, for example, because it was mis-printed, it was damaged during transit, or the like. If the barcode fails to scan, the system may present an interface allowing the courier to search for the barcode, and associated ID, or the recipient via a manual search process as disclosed in further detail below.

If the barcode scans properly, i.e., can be scanned by the system and the encoded information can be extracted by the parcel locker system, but is not valid for the parcel locker, i.e., it is not included on the package manifest for the locker system, an error message may be displayed to the courier. The message may indicate, for example, that the parcel is not planned for delivery at the location or the particular parcel locker system.

As previously disclosed, a parcel locker system as disclosed herein may provide fallback instructions to a courier delivering parcels to the system, for example when a recipient cannot be found or a parcel does not fit in any available locker of the parcel locker system. The instructions may be presented via the user interface of the parcel locker system, which may display any instructions set by a property manager or other entity that manages the parcel locker system at the location where it is installed. The fallback instructions may be configured by the manager, for example, via a configuration page accessed directly on the system, via a web-based interface, or the like. The system may present pre-set options from which the property manager can select and/or it may provide for arbitrary text to be provided by the manager for display during the fallback process. Examples of options that may be provided for default fallback instructions include delivering the parcel to a central office, delivering the parcel directly to the recipient, instructing the courier to try the delivery again at a later time, or the like.

Each preset fallback option may include various data elements: a label for the pulldown menu, a description provided to the courier, a description provided to the recipient, an indicator of whether to treat the parcel as being delivered, and an indicator of whether to treat the parcel as being received or "picked up" by the recipient. Examples of such data for predefined fallback options are shown in Table 2.

TABLE 2

| Fallback Option | Mark as Delivered? | Mark as Received by Recipient? | Courier Instructions | Recipient Notice |
|---|---|---|---|---|
| Deliver to Office | Yes | No (expect property to manually mark as picked up once claimed by recipient) | Deliver to property management office | Package was delivered to management office |
| Deliver directly to recipient | Yes | Yes | Deliver directly to resident door/ business office/ recipient | Package was delivered to front door/building |
| Try again later | No | No | Attempt delivery later | None |
| Custom | Provided by property manager | Provided by property manager | Provided by property manager | Provided by property manager, may be disabled unless "mark as delivered" is set |

At any point in the delivery process, a courier may select an option to stop scanning parcels for delivery, in which case the delivery process may conclude via a "check out" process as disclosed herein. This option also may be used to temporarily stop and later resume parcel delivery of parcels in a particular package manifest. To allow for such an option, a secondary QR code may be displayed that the parcel locker system will link to the package manifest to allow the courier to resume delivery later. The secondary QR code may be the same one scanned initially, or it may be a newly-generated QR code. It may be preferred to re-use the same QR code to reduce user error and further simplify the delivery process for the courier.

To resume scanning, the courier may re-scan the original QR code used to begin the delivery process in FIG. 2. The parcel locker system will then retrieve the package manifest as previously disclosed and, for each tracking number/parcel listed in the manifest, the system will check the internally-stored manifest or other database to determine if it has already been delivered to a locker. The courier may then be prompted to continue delivering parcels as if the process had not been suspended. The resulting updated manifest may include both information on previously-delivered parcels as well as those delivered after the courier resumes the delivery process. In some cases, the courier also may use this "resume delivery" process to attempt delivery of parcels that were not previously attempted to be delivered, or that were recorded as not available for delivery. If a parcel that was previously indicated as undeliverable is re-scanned by the courier, it may be possible that a locker is now available that was not previously available, and the courier may continue to complete the delivery process.

As previously disclosed, in some embodiments a "manual search" option may be provided in addition to the automatic scanning option for individual parcel barcodes. Such an option may be used, for example, if the barcode has been lost from the parcel, damaged during transit, or was not properly printed. The manual search option may present an option for the courier to manually enter a recipient name and/or address, to search through known recipients as previously disclosed, or a combination thereof. It also may allow for searching by tracking number of the parcel, which may be available to the courier separately from the damaged or missing barcode. Regardless of the particular method used to search, the search process described with respect to 421/422 and related steps in FIG. 4 may be performed based upon the courier's input.

As previously disclosed, the parcel locker system may provide a "check out" option to the courier to use, for example, to indicate that all parcels in the delivery have been scanned, or where the courier interrupts the process before completing delivery of all parcels in a package manifest. The check out option may provide a mechanism for the courier to resume delivery later as previously disclosed and/or, if the system confirms that all parcels in a package manifest have been successfully delivered, it may display a completion message. Information about the delivery and the package manifest may be provided to the courier as part of the check out process, such as the date/time of the QR code scan for the manifest, a unique ID of the automated parcel locker system, and package-specific information. The package-specific information may include, for example, a tracking number, whether the parcel was scanned at the locker and the time it was scanned, whether the parcel was delivered to the locker and, if not, a reason it was not delivered (e.g., no locker available, recipient not found), and the like. This information also may be stored in a record associated with the QR code of the package manifest and/or encoded in a new QR code presented to the courier to scan to complete the delivery. Some, any, or all of this information also may be recorded in the parcel locker system memory, provided to a remote management system, or provided to the courier company, whether directly via a remote network connection or via the QR code provided to the courier. In some embodiments, the information will not be displayed to the courier, especially where there are a large number of parcels in the package manifest.

The check out screen also may display summary information to the courier, such as the total number of packages originally listed in the package manifest, the number successfully scanned and/or remaining to be scanned, the number of packages delivered to lockers, the number of packages unable to be delivered, and the like. Sub-categories also may be displayed, such as the number of packages that could not be delivered due to lack of an available locker, the number not delivered due to no recipient being found, and the like. Summary information also may be displayed during the processes described in FIGS. 2 and 4, for example to provide a running count of the number of parcels total, scanned, delivered, and/or not delivered in the package manifest.

In some embodiments, the parcel locker system may provide information to a remote management system, the courier company, and/or a local property management system during the delivery processes. Alternatively, information about a particular package manifest delivery may be provided only upon completion of the delivery, such as when the check out process is performed and completed by the courier.

Embodiments disclosed herein prove improvements and extensions to computerized, automated parcel delivery and reception systems. Such systems rely on the computerized communication, processing, and storage systems to provide the efficiency and volume of parcel delivery required by modern shipping and receiving systems. As such, the processes and systems disclosed herein could not reasonably be performed by humans, or in the human mind, or the like, due to the necessity of interfacing with existing computerized shipping systems. For example, the processes described herein could not be performed without the specialized devices, computer processors, and software disclosed in relation to the same. Furthermore, automated parcel locker systems as disclosed herein are designed to prevent access by arbitrary users to the information stored therein, including the occupancy status of each locker, the resident/recipient information stored in the local database and the like. Accordingly, automated techniques and systems as disclosed herein are necessary to effectuate delivery of parcels to the automated parcel locker as disclosed, since the associated systems do not provide human-readable information and/or human-accessible components, other than as disclosed herein.

More generally, various embodiments may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, computer-readable instructions to implement techniques disclosed herein may be stored on a computer-readable storage medium and may be implemented by a general-purpose processor, execution of which may transform the general-purpose processor or a device containing the general-purpose processor into a special-purpose device configured to implement or carry out the instructions. Embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

The above description includes several example implementations. However, it will be understood by one of skill in the art that the invention disclosed herein is not limited to the implementations described and can be practiced with modification and alteration within the spirit and scope of the appended claims. The description is thus illustrative instead of limiting.

The invention claimed is:

1. A method, performed by a computerized controller in a computerized automated parcel locker system including a plurality of lockers, each having an associated door and an associated sensor, the method comprising:
scanning a first machine-readable code provided by a parcel courier;
obtaining a package manifest linked to the first machine-readable code, the package manifest including delivery information for a plurality of parcels to be delivered to the parcel locker system;
for each parcel in a set of parcels listed in the package manifest:
obtaining recipient information for each parcel from the package manifest;
determining whether the recipient information for each parcel from the package manifest matches a recipient served by the parcel locker system by comparing the recipient information to a list of recipients served by the parcel locker system; and
if the recipient information for each parcel matches a recipient served by the parcel locker system, assigning a locker of the plurality of lockers to each parcel or, if the recipient information for each parcel does not match any recipient served by the parcel locker system marking the parcel as undeliverable to the parcel locker system;
for each parcel assigned to a locker of the plurality of lockers:
scanning a machine-readable code assigned to the parcel assigned to a locker;
opening a door of the locker to which each parcel was assigned;
receiving a signal from a door of the locker to which each parcel was assigned indicating that the door was closed; and
subsequent to receiving the signal from the door, notifying the courier, a recipient of each parcel assigned to the locker, or both, that the parcel was delivered to the parcel locker system; and
for a parcel listed in the parcel manifest and not included in the set of parcels:
determining that recipient information for the parcel not included in the set of parcels matches a recipient served by the parcel locker system;
determining that no available locker in the parcel locker system is capable of receiving the parcel not included in the set of parcels; and
responsive to determining that no available locker in the parcel locker system is capable of receiving the parcel not included in the set of parcels, providing fallback delivery instructions to the courier.

2. The method of claim 1, wherein the first machine-readable code is a QR code.

3. The method of claim 2, wherein the package manifest is encoded in the QR code.

4. The method of claim 1, wherein the step of determining whether the recipient information for each parcel from the package manifest matches a recipient served by the parcel locker system comprises applying one or more text matching algorithms to find a match.

5. The method of claim 4, wherein the one or more text matching algorithms match text based on one or more selected from a group consisting of: phonetic similarity; a presence or absence of spaces and/or hyphens; missing recipient name components; split and/or mismatched recipient database fields; recipient name spelling differences; differences in recipient titles; order variations; language differences; nicknames and/or shortened names; recipient truncations; initials used in place of full names; and variant names.

6. The method of claim 1, wherein the first machine-readable code encodes the package manifest in its entirety.

7. The method of claim 1, wherein the step of obtaining the package manifest linked to the first machine-readable code comprises receiving the package manifest from a remote parcel locker management system.

8. The method of claim 1, wherein the list of recipients is provided by a property management system of one or more residences of recipients on the list of recipients.

9. A computerized automated parcel locker system comprising:

a plurality of lockers, each locker of the plurality of lockers having an associated door and an associated sensor configured to detect a presence of an object within each locker;

a user interface comprising a scanner and a display;

a computerized controller in signal communication with each sensor and with the user interface, the computerized controller configured to:

scan, with the scanner, a first machine-readable code provided by a parcel courier;

obtain a package manifest linked to the first machine-readable code, the package manifest including delivery information for a plurality of parcels to be delivered to the parcel locker system;

for each parcel in a set of parcels listed in the package manifest:

obtain recipient information for each parcel from the package manifest;

determine whether the recipient information for each parcel from the package manifest matches a recipient served by the parcel locker system by comparing the recipient information to a list of recipients served by the parcel locker system; and if the recipient information for each parcel matches a recipient served by the parcel locker system, assign a locker of the plurality of lockers to each parcel or, if the recipient information for each parcel does not match any recipient served by the parcel locker system, mark the parcel as undeliverable to the parcel locker system;

for each parcel assigned to a locker of the plurality of lockers:

scan a machine-readable code assigned to the parcel assigned to a locker;

open a door of the locker to which each parcel was assigned;

receive a signal from a door of the locker to which each parcel was assigned indicating that the door was closed; and subsequent to receiving the signal from the door, notify the courier, a recipient of each parcel assigned to the locker, or both, that the parcel was delivered to the parcel locker system; and for a parcel listed in the parcel manifest and not included in the set of parcels:

determine that recipient information for the parcel not included in the set of parcels matches a recipient served by the parcel locker system;

determine that no available locker in the parcel locker system is capable of receiving the parcel not included in the set of parcels; and responsive to determining that no available locker in the parcel locker system is capable of receiving the parcel not included in the set of parcels, provide fallback delivery instructions to the courier.

10. The parcel locker system of claim 9, wherein controller is further configured to apply one or more text matching algorithms to determine whether the recipient information for each parcel from the package manifest matches a recipient served by the parcel locker system.

11. The parcel locker system of claim 10, wherein the one or more text matching algorithms match text based on one or more selected from a group consisting of: phonetic similarity; a presence or absence of spaces and/or hyphens; missing recipient name components; split and/or mismatched recipient database fields; recipient name spelling differences; differences in recipient titles; order variations; language differences; nicknames and/or shortened names; recipient truncations; initials used in place of full names; and variant names.

12. The parcel locker system of claim 9, wherein the scanner is configured to scan QR codes, barcodes, or both.

13. The parcel locker system of claim 9, wherein the first machine-readable code encodes the package manifest in its entirety.

14. The parcel locker system of claim 9, further comprising a network interface in signal communication with the controller, wherein the step of obtaining the package manifest linked to the first machine-readable code comprises receiving the package manifest from a remote parcel locker management system via the network interface.

15. The parcel locker system of claim 9, further comprising an internal computer-readable storage medium storing the recipient information for the recipients served by the parcel locker system.

16. The parcel locker system of claim 9, wherein the list of recipients is provided by a property management system of one or more residences of recipients on the list of recipients.

* * * * *